March 6, 1962 E. W. BABCOCK 3,023,542
SHEET GLASS BENDING APPARATUS

Filed March 19, 1958 2 Sheets-Sheet 1

Inventor
Eugene W. Babcock
By Nobbe & Swope
Attorneys

March 6, 1962 E. W. BABCOCK 3,023,542
SHEET GLASS BENDING APPARATUS
Filed March 19, 1958 2 Sheets-Sheet 2

INVENTOR.
Eugene W. Babcock
BY Nobbe & Swope
ATTORNEYS

United States Patent Office 3,023,542
Patented Mar. 6, 1962

3,023,542
SHEET GLASS BENDING APPARATUS
Eugene W. Babcock, Toledo, Ohio, assignor to Libbey-Owens-Ford Glass Company, Toledo, Ohio, a corporation of Ohio
Filed Mar. 19, 1958, Ser. No. 722,444
20 Claims. (Cl. 49—67)

The present invention relates broadly to the bending of glass sheets, and more particularly to novel supporting and operating means for certain glass contacting members which are adapted to engage the sheet during the bending operation.

This application is a continuation-in-part of my co-pending application Serial No. 264,022, filed December 29, 1951, now abandoned.

The bending of glass sheets to predetermined curvatures on molds, by positioning the sheet to be bent on the mold and then passing the mold and glass through a furnace until the glass is heated to a temperature at which the sheet will sag into contact with the shaping surface of the mold, is well known in the art.

It has also been the practice in some cases to associate with such molds, members which are adapted to contact the glass sheet at various stages of the bending operation for a number of different purposes. For example, sheet locating means are sometimes provided at the ends of the mold to properly position the sheet to be bent in relation to the shaping surface of the mold, and these locators have heretofore been actuated by weights or the like to apply end-wise pressure on the glass sheets. It has also been a practice to employ glass contacting members for the purpose of preventing unwanted sagging of the glass in certain areas, and/or for inducing additional bending by pressure in other areas.

Briefly stated, the present invention is predicated on the discovery of novel supporting apparatus for glass contacting members of the above character, which supporting apparatus embody a bi-metallic element which bends under the influence of the bending heat to cause movement of the glass contacting member in the manner desired to assist in bending the sheet into proper engagement with the bending surface of the mold.

It is therefore an important object of this invention to provide a support for a sheet contacting member associated with a bending mold, in combination with a bi-metallic element forming a part of said support, and operable with changing temperature, to cause the movement of said contacting member relative to the sheet.

Another object is the provision of a support for a sheet contacting member associated with a bending mold together with an operating element connected to the support to cause movement of the contacting member in synchronized relation with an increase in the bending heat.

Another object is to provide a support for sheet locating members associated with a bending mold and adapted to contact the edge of a sheet to be bent, with a bi-metallic element forming a part of the support and operable under an increase in bending temperature to cause the locating members to exert pressure against the edge of the sheet.

Another object is the provision, in combination with a member positioned above the upper surface of a glass sheet on a bending mold, of a support for said member associated with the mold and including a bi-metallic element operable by an increase in the bending temperature to move said member downwardly into contact with the glass sheet and to urge it toward said mold.

Still another object is to provide a member positioned to contact the lower surface of a glass sheet to be bent on a mold, a support for the member associated with the mold, and a bi-metallic element connected to said support and operable as the bending temperature increases to cause movement of the contacting member out of contact with the sheet.

Other objects and advantages of the invention will become more apparent during the course of the following description, when taken in connection with the accompanying drawings.

In the drawings, wherein like numerals are employed to designate like parts throughout the same.

Figure 1:
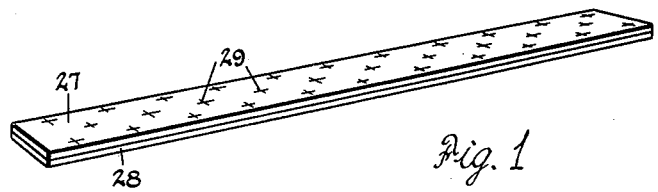
FIG. 1 is a perspective view of a bi-metallic element forming part of a locator support.
Figure 2:
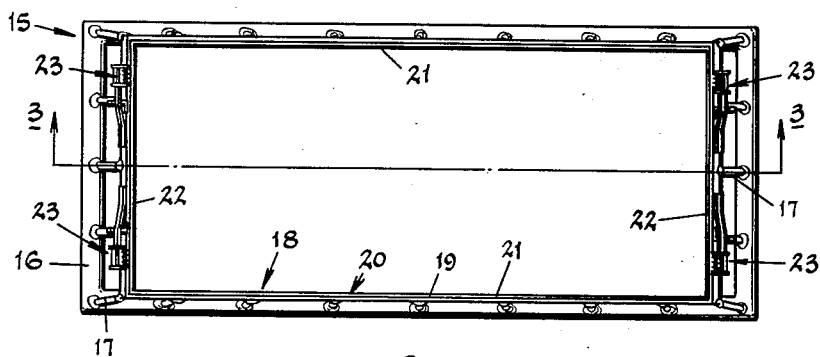
FIG. 2 is a plan view of a sheet glass bending mold equipped with locators and mountings constructed in accordance with the invention.
Figure 3:
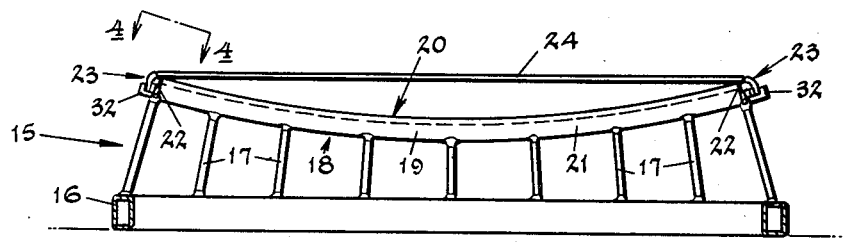
FIG. 3 is a longitudinal sectional view of the bending mold taken substantially along the line 3—3 of FIG. 2.

Referring now more particularly to the drawings, there is illustrated in FIGS. 1 to 5 a typical bending apparatus for glass sheets or plates, which includes a mold that is provided with sheet-locating members. As best shown in FIGS. 2 and 3 the particular bending apparatus illustrated, and which is designated in its entirety by the numeral 15, comprises a rectangular base or frame 16 above which is supported, by struts 17, a mold 18 of the so-called periphery or ring type. This is, the mold 18 is made up of a continuous rail 19 which is arranged to follow a closed outline which conforms to the outline of the glass sheet or sheets that it is desired to bend on the mold. The shaping surface 20 of the mold 18 is formed on the upper edge of the rail 19 and is of the curvature, as viewed in the vertical plane, to which it is desired to bend glass sheets on the mold.

The rail 19 of this exemplary mold 18 has substantially parallel side sections 21 and oppositely disposed parallel end sections 22 on which the locator devices, generally indicated by the numeral 23, are carried. Although the utility of the locator devices 23 is in no wise restricted to a mold of this general character, the rail 19 of the present mold is so formed as to produce a single bend in a sheet of glass. Thus the side sections 21 of this rail are shaped to provide the curved portions of the shaping surface 20 which will cause the glass sheet 24 to bend in its longitudinal axis while those transverse portions, or the end margins of the sheet 24, on the end sections 22 of the rail will be supported so as to maintain the sheet substantially in a transverse flat, or planular condition.

The sheet locating devices 23, which are located on the end mold sections 22 adjoining the shaping surfaces thereon, are adapted, primarily, to properly locate the glass sheet to be bent with relation to the shaping surface 20 of the mold.

Figure 5:
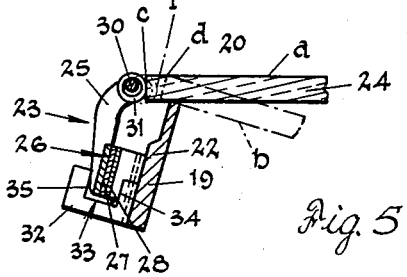
FIG. 5 is an enlarged cross-sectional detail of the locator and support taken substantially along the line 5—5 of FIG. 4.

As shown in FIG. 5, the glass sheet 24, when first placed or located, between the locators 23 on the mold, will be supported upon its opposite end margins on the end sections 22 of the rail 19, as indicated by the full lines *a* and, when completely bent, in a manner as indicated by the broken lines *b*. Now, in ordinary gravity bending, in the event that one end or the other, or both of the ends, does not move inwardly from a point as indicated at *c* to the point *d*, then there will be a resultant endwise displacement of the glass sheet, when finally bent, at the opposite end thereof or distorted areas directed inwardly toward the center area of the sheet should both end margins fail to move equally during bending. Aside from the possibility of the sheet dropping from the mold, this would result in the production of a defectively bent glass sheet, due to the fact that the glass when softened could not adequately shift relative to the mold.

This difficulty is overcome, according to the present invention by the provision of special supports for the locating devices so that, while the glass sheet is softening and settling downwardly, these locator devices will move against the end edges of the sheet and literally "push" the end margins inwardly. By arranging a plurality of such devices in substantial parallelism at the ends of the mold 18, as shown in FIG. 2, a generally equalized inward movement will be effected to the end that the sheet will be enabled to freely settle into bent conformity with the shaping surface 20 without any resistance to its movement at one or both of its ends.

The purpose of this equalized movement in a positive manner is to reduce, if not eliminate, any tendency of the softened glass, at or in the end margins of the sheet, to become slightly affixed to the shaping surface on which said end margins are supported. Where the glass actually adheres, however slightly, to the surface of the mold, the balance of the sheet will be shifted to a skewed position on the mold or its movement thereon will be greater from the free end of the sheet. Since either of these conditions reduces free settling of the glass, satisfactory bending of the glass into conformity with the mold shaping surface is prevented.

For this purpose, each of the locator devices 23, which comprises a U-shaped member 25, is fixedly secured as by welding or like methods to a special support 26. This support is fixedly attached at its opposite end to the surface of the adjacent end section of the rail 19 and is in the form of a bar of bi-metallic construction.

Thus, as best shown in FIG. 1 this bar is comprised of two strips of metal 27 and 28 that are intimately associated or affixed to one another as by spot welding or like methods as indicated at 29. Each of the strips 27 and 28 possesses a predetermined and characteristic coefficient of expansion. This characteristic is obtained by the selection of a metal having a composition that will respond to heat within a closely estimated range of temperature. Thus, the two strips 27 and 28 have been chosen from metal alloy compositions which will more or less respond to ranges of temperature comparable to the bending temperatures of glass or within an approximate temperature range of between 800° and 1400° F. Obviously there may be several preferred metal compositions within such a selective class and which will function satisfactorily for the present purpose, and, within the scope of my invention, no particular metal or metal alloyed composition is to be considered of major importance. However, and by way of example, metal alloys that are commercially identified as AISI (American Institute of Steel Industry) 304 and AISI 430 have been selected. The first is known to have constituent parts of .08% maximum carbon, 18 to 20% chrome, 8 to 11% of nickel and a balance of iron while the second has a consistency of 12% maximum carbon, 14 to 18% chrome, no nickel and the balance of iron.

By reason of these differences of composition, the metal, AISI 304, or the strip 27, has been found to possess a physical expansion capacity that is substantially twice that of the AISI 430 metal, or the strip 28. In other words, when firmly adhered to one another and subjected to a heated atmosphere within the above-mentioned range, the strip 27 will be physically elongated more rapidly than the strip 28 and consequently there will be a deflection of the bimetal bar 26. The character of this deflection may be somewhat controlled by the manner in which the bar 26 is supported by or secured to the base member. The rate of elongation, as evidenced by the deflection of bar 26, may also be influenced by the relative thicknesses of the component strips 27 and 28 so that if a thicker strip is selected for the component 28 than for the strip 27, this will set up a natural resistance to the physical action of said strip 27. This will operate and may be utilized to more closely govern the resultant functioning of the bar 26 while it is subjected to heat.

At the upper end of the U-shaped member 25, provision is made for carrying a pin 30 upon which is loosely mounted a coil spring 31 which affords the bearing surface for the locator device against the glass. While this bearing surface is herein shown as provided by the helical coil spring 31, it is to be understood that a suitable cylinder or sleeve of ceramic or like material can be substituted therefor without altering the function of the locator or departing from the spirit of the invention. The coil spring 31 is adapted to be urged in bearing contact with the glass by means of the support or bar 26. The bar 26, moreover, effects this contact by the spring from the initial period of loading of the glass to and including a portion of the initial bending within a prescribed limit of its motion as permitted between the point of its attachment to the rail 19 and a point adjacent the U-shaped member 25. Physical motion is thus imparted to the bar by reason of its bimetal formation and is of such a positive nature that the resultant action at each of the springs 31 is to enforce inward, endwise movement upon the ends of the glass sheet.

Figure 4:
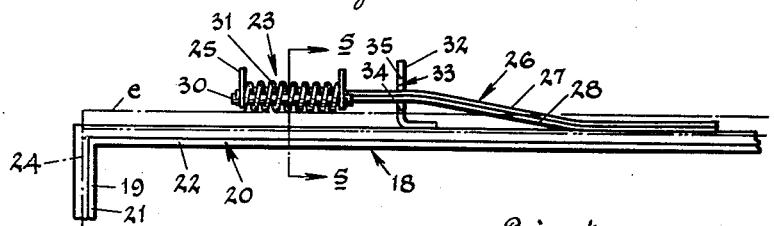
FIG. 4 is a fragmentary plan view of an end of the bending mold looking in the direction of arrows 4—4 of FIG. 3.

Now, in the bending operation, the normal relationship effected by the strips 27 and 28 to one another, and at normal temperatures, will cause them to assume, in the form of bar 26, a position as shown in FIG. 4, and in which a sheet of glass 24, as shown in broken lines *e*, can be located with an edge in contact with the annular surface of spring 31 of a locator device 23. Obviously if the locator 23 shown in FIG. 4 is taken as that one in the lower left corner of the mold in FIG. 2, then when the similar locator devices 23, on the same or opposite end section of the mold, contact the same edge or the opposite edge of the sheet, said sheet will be properly located with reference to the shaping surface 20 of the mold 18. During progress of the mold through a conventional type of bending furnace or kiln, the glass thereon is gradually heated until it becomes sufficiently plastic to sag toward the shaping surface. In a related nature, the bar 26 is caused to arch and, as the component strip 27 thereof is physically elongated, curve inwardly to urge the spring 31 in a following movement with the glass. Since the spring 31 of each of the plurality of locator devices 23 is being simultaneously carried in this manner, the opposed end margins of the sheet 24 will be equally urged or pushed inwardly on the mold. Consequently, there will be an equalized amount of endwise motion imparted to the glass and it will freely settle onto the shaping surface in a satisfactory manner and without either or both of its ends offering any resistance to its bending.

If desired, once the ends of the sheet have been caused to move inwardly, the locator devices 23 may be, and preferably are, halted in their related inward movement so that in the final moments of bending there will be no contact between the springs 31 and the glass edges. To provide for arresting movement of the locator devices 23, suitable angles 32 having notches 33 formed therein are mounted on the rail as shown in FIG. 4. The inner edge surface of the notches 33 is formed to contact the bar 26 at that interval of movement of said bar when separation is to be effected. Thus as shown at *f* in FIG. 5 when the bar 26 engages the inner edge 34 of notch 33, the spring 31 will be restrained from further pushing action against the glass and the glass will settle further, as indicated at *d*, by reason of its plastic condition. Also, if desired, the width of notch 33 may be such that the outer edge 35 will constitute the "rest" position of the locator devices or loading position for the glass relative to the springs 31.

In the event that a double or compound bend is to be produced through both the longitudinal and transverse axes of a glass sheet, the end sections of the mold will be suitably shaped to provide oppositely disposed areas of a shaping surface of the desired transverse curvature. Although this feature is not shown, a mold having a shaping surface of double curvature may be equipped with transversely aligned pairs of locator devices on the side sections as well as on the end sections so that a glass sheet to be bent thereon will be caused to move not only inwardly through its longitudinal axis but also through its transverse axis in an equalized manner.

The form of the invention illustrated in FIGS. 6 to 10 is best adapted for use with a somewhat different type of mold construction, and the sheet contacting means of this form of the invention is provided for locating and/or supporting sheets of considerable length, preliminary to their bending, on the mold. Thus, the typical bending apparatus illustrated as embodying this form of the invention is indicated at 36 in FIG. 6 and comprises a mold 37, supported by struts 38 on a base 39. The mold 37 is of the hinged variety and the struts 38 are connected at their upper ends to a stationary central section 40 of the mold while the end mold sections 41 are pivotally connected to the central section through the medium of hinges 42.

The mold end sections 41 are moved from the open to the closed position by the linkage mechanism generally indicated by the numeral 43 which comprises a depending bar 44 rigidly secured to each mold end section 41 and provided at the lowermost end thereof with a pivotally secured actuating rod 45 pivotally mounted at its opposite end upon a rotatable plate 46 rigidly secured at right angles to a shaft 47 which in turn is supported by bearings 48 at opposed ends thereof. To rotate the plate 46 about the shaft 47 thus moving the mold sections from the open to the closed position an upwardly extending rod 49 is fixedly secured at its lowermost end to a shaft 47 and is provided with a weight 50 at its uppermost end. The action of the weight is such as to provide a relatively constant torque on the shaft 47 prior to the bending of the glass sheet thus imparting a tendency to the mold end sections to move upwardly and which tendency is resisted by the weight of the glass sheet 51. However, upon the softening of the glass by the application of heat the sheet does not provide the necessary resistance to the upward rotation of the mold end sections and the weight 50 accordingly acts to move the mold end sections from the open to the closed position.

Bending molds of this character are commonly employed to produce bent curvatures which include sharply curved and upwardly rising end portions in sheets of glass and like materials. That is to say, the bend to be produced will possess a more bowed or arched contour even to the point of resembling a modified U in shape. The position of the end sections 41, indicated by broken lines *g* in FIG. 6, thus represent the closed mold position while their positions in full line illustrate the open mold position in which the flat glass sheet or sheets is received thereon. When the end sections 41 of the mold are in an open mold position, as shown in full line in FIG. 6, so as to receive a sheet or sheets of flat glass, such as the sheet 51, there is found to exist a considerable unsupported area between the ends of the glass.

These ends are usually carried by and supported on conventional and suitable locating devices 52, commonly termed "flippers," and operatively associated with the end mold sections 41. However, the expanse of the intervening glass body and the very nature of its brittle structure often causes the sheet to inadvertently sag and break before bending actually is accomplished.

Now, this tendency of the glass to sag in its centermost area is overcome according to the present invention by a sheet contacting member and a special support therefor which include an articulated brace 53 carrying a sheet contacting mmeber 54 upon which the glass sheet can be centrally supported until such time that it has started to soften and will settle onto the shaping surface of the mold as the end sections 41 thereof are caused to close. Since the brace 53 is arranged in approximately the center of the mold, it will initially operate to maintain the glass sheet in its planular condition. This will assure that the ends of the sheet will be accurately located on the end sections of the mold and consequently the brace 53 may, in essence, be considered broadly as a locating and supporting element or device for the sheet to be bent.

Figure 6:
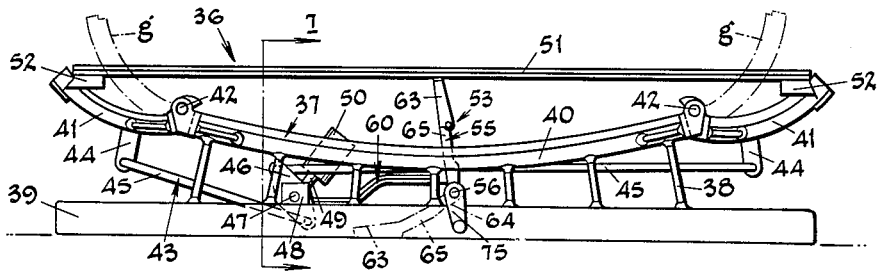
FIG. 6 is a side elevation of a hinged bending mold showing a glass contacting member positioned to support the middle of the glass sheet against premature bending.
Figure 7:
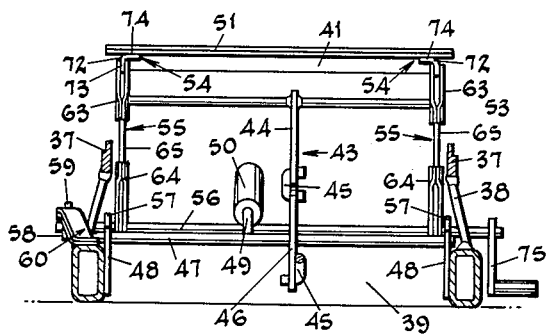
FIG. 7 is a transverse sectional view of the mold shown in FIG. 6, taken substantially on the line 7—7 of FIGURE 6.
Figure 8:
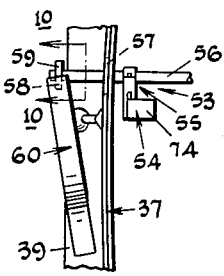
FIG. 8 is fragmentary plan view of the glass contacting member of FIGURE 6 with its support.

In order that this brace will be removed from the zone of action or literally disappear from beneath the glass sheet, the same is constructed of jointed members that are adapted to support one another in one position and when arranged as shown in FIG. 6. As shown in this figure, jointed members form legs 55 that will be disposed in a plane inclined to the vertical. As shown in FIG. 7, the two legs 55, comprising the locating and supporting elements of the brace 53, are mounted fixedly on a shaft 56. The shaft 56 is journaled in plates 57 secured to the opposed side elements of the base 39. At one end of the shaft and outwardly of the base 39, there is secured a cam shaped disc 58 having a nose or outwardly directed lug 59 that may be engaged to prevent rotation of the shaft. This disc is intended to support and maintain the legs 55 in their inclined position.

Figure 10:
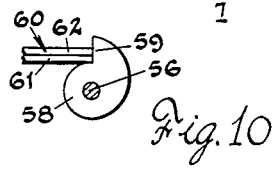
FIG. 10 is a vertical sectional view of the support, taken substantially on the line 10—10 of FIG. 8.

The lug 59 of the disc 58 is engaged by a bar 60 formed of a bimetal strip of similar construction to that previously described in connection with the bar or support 26. One end of the bar 60 is fixedly secured to the base 39 while the opposite end is directed into normal engagement with the lug 59, as shown in FIG. 10. Preferably in this arrangement, the strip 61 of bar 60, having the higher co-efficient of expansion, is positioned beneath the strip 62 which has the lower co-efficient or so that upon elongating under the influence of heat, the lower strip 61 of bar 60 will cause the same to flex upwardly. This upward flexing of the bar is predetermined to coincide with the softening condition of the glass and at the definite interval of bending when active support of the glass by the brace 53 is to be withdrawn.

Since the brace must be replaced in its inclined position prior to each use of the mold for bending and that the same may be accomplished without unnecessary lifting and movement of the mold, the legs 55 of the brace 53 are, as previously noted, formed of jointed members. As shown in the drawings and particularly FIGS. 7 and 9, these members include substantially similar end members 63 and 64 and a link member 65 interposed therebetween. One end of each of the members 63 and 64 is provided with an offset opening for receiving a pin 66 that is carried by a related end of the link 65.

Figure 9:
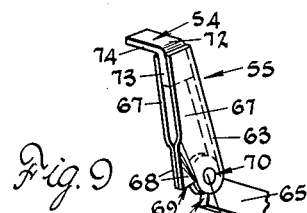
FIG. 9 is a fragmentary perspective of the upper portion of the same.

As illustrated in FIG. 9, the end member 63 is formed of two similarly shaped plates 67 that are slightly wedge shaped in outline. The plates 67 are generally spaced from one another in parallel relation but, at one lower corner of each plate, there is an area indicated at 68 that is depressed from the major plane thereof. The depressed areas 68 of the plates 67 are so arranged that they may be secured together by welding or like methods to not only form the plates integrally into the member 63 but also afford a common lower surface 69.

At the opposite lower corner of each plate 67, there is provided an opening 70 for the pin 66. The opening 70 in each plate is offset from the longitudinal axis of the plate and in a similar manner, a pin 66 is carried in each end of the link 65 in an offset position relative to its longitudinal axis. By so locating the pin 66 in the link 65, defined edges 71 at either end of the link will be created and one of these edges 71 will be located in abutting relation to the lower surface 69, as shown in FIG. 9, of the plates 67 forming the member 63. In the opposite end of the member 63, an angle plate 72 is secured between the plates 67 by the downwardly directed leg 73 thereof.

The other end member 64 is formed similarly to the member 63 but its position is bodily reversed and in the end opposite that one carrying the pin 66, openings are provided through which the shaft 56 may be inserted before the member 64 is fixedly secured to the shaft.

The abutting relation established between the surfaces 69 of the end members 63 and 64 and the adjacent edges 71 of the link members 65 operates to prevent rotation of any of the members relative to another when the said members are arranged as shown in FIG. 6 to form the legs 55 of brace 53. This association of the members is also fixed by reason of the inclined position of the legs 55 since the tendency of each of the individual members would be to rotate downwardly and this is prevented by the abutting engagement of the surfaces 69 and end edges 71.

In the bending of a glass sheet or sheets to a curvature described by the central mold section 40 and the end mold sections 41 when they are in the closed mold position, indicated by the broken line position of said end sections, 41 in FIG. 6, the legs 55 are placed in their inclined positions by arrangement of the component members 63, 64 and 65 in alignment. The sheet contacting members 54 are thus provided by the horizontally directed leg 74 of each angle plate 72 carried by end members 63 and are now positioned to support a glass sheet and by thus carrying the weight of the sheet actually locate the ends of the same from the central area thereof so that the ends will be simultaneously located on the devices 52, operatively associated with the end mold sections 41.

During movement of the bending apparatus 36 through a bending furnace, the heat influence gradually softens the glass to its bending temperature and the tendency of the sheet to shatter from its weight and between the supported ends thereof is dissipated. The tendency of the glass is, accordingly, to bodily sag downwardly toward the shaping surface of the mold. Also as the plastic condition of the glass becomes satisfactory for such bending the end sections 41 of the mold 37 are adapted to swing upwardly under the influence of the linkage mechanism 43 toward the closed mold position thereby influencing to some extent the settling motion of the central area of the glass sheet.

More particularly the linkage mechanism 43 is actuated by the torque imparted by the weight 50 to the shaft 47 through the rod 49 which causes the shaft 47 to rotate in the bearings 48. This in turn causes the plate 46 to rotate about the axis of the shaft 47 thereby moving the actuating rods 45 outwardly in a direction substantially parallel the longitudinal center line of the mold thus swinging the end sections 41 upwardly about the hinges 42. It is apparent that as the length of the rod 49 is increased the weight 50 will be located in a position more removed from the shaft 47 which will impart a correspondingly greater torque thereto because of the increased length of the lever arm.

At this period of the bending, the bar 60, which has been heretofore supporting the brace 53 in its inclined position by engagement with the cam shaped disc 58, is influenced by the heated atmosphere of the furnace and flexes upwardly until its end becomes disengaged from the lug 59 of the disc 58. Since the legs 55 of the brace 53 are inclined to the vertical, they will immediately, upon release of the lug 59, swing radially downward when the shaft 56 is free to rotate. As the end member 63 comes to rest on the supporting surface of the mold, or its movement is otherwise actively arrested, the component members 63, 64 and 65 will be permitted to "break" from their aligned relation and assume relative positions as are shown in broken line in FIG. 6.

This pivotal relation of the members 63, 64 and 65 also facilitates their return to the operative inclined position. For this purpose, the shaft 48 is equipped with a crank 75 by which it can be rotated and the members carried thereabout as the members 63, 64 and 65 pivot on the associated pins 66 and are carried beneath and between the shaft 56 and the surface on which the mold is supported. When the end member 64 has been carried radially and counter-clockwise to an inclined position generally assumed by the brace 53, the lug 59 of disc 58 is brought into engagement with the end of the bar 60 and further rotation of the shaft is halted, the bar 60 having been restored to the position of engagement when the heat therein is dissipated and the normal relation of its component strips is restored. Also since the legs 55 are located in an inclined position, tending to produce rotation, they will, by their weight, hold the lug 59 firmly against the end of the bar.

The advantage of such use of bimetal elements as supports for the glass sheet contacting devices will now become apparent and the novel employment of supports having a bimetal construction is believed to afford a positive control over the endwise motion of glass during its bending which has heretofore been dependent upon adaptability of the glass to move while soft across the surface on which it was supported. Often the very character of the curvature, or the end outline of the glass to be bent to such a curvature, has reacted against the natural tendency of the glass, in sagging centrally, to shift inwardly from each end. The fact that the strips comprising the support may also be of a predetermined heat sensitivity further bears out the novelty of locator construction herein set forth. Obviously the response of the metals to heat at definite temperatures makes it possible for me to select strips of particular metals that will react by elongation or produce a flexing action at the desired temperature point in the heating of the glass at which operation of the locator devices is intended to occur.

Figure 11:
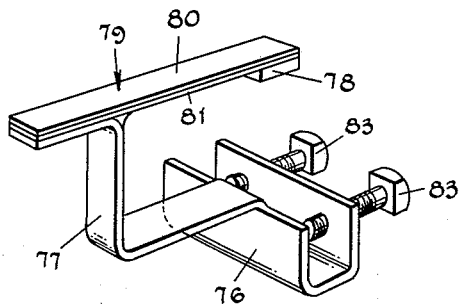
FIG. 11 is a perspective view of a sheet contacting member positioned to exert pressure on an upper marginal surface of the glass sheet during bending.
Figure 12:
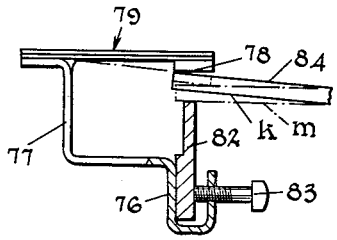
FIG. 12 is a side view, partially in section, of the sheet contacting member of FIG. 11, with its support, and showing one way of operatively mounting the support on a bending mold.

As shown in FIGS. 11 and 12, there is still a further and somewhat analogous use in which specially supported sheet contacting members may be employed. Thus, the sheet contacting means in this modified construction is carried by a clamping bracket 76 that has a Z shape extension 77. The contacting member or pad 78 is supported on the extension 77 by means of a bar 79 formed of bimetal strips 80 and 81. In this particular construction, the upper strip 80 will be selected from a metal alloy group which will have a higher coefficient of expansion than the lower strip 81. Consequently when the bar 79 is subjected to heat, physical elongation of the strip 80 will cause the bar to flex or bend downwardly from its supported position on the extension 77.

This locator may be used to advantage to restrain or support an area of a bent sheet of glass to a particular area of such bend. This restraint may be necessitated by reason of the fact that one or more especial areas of the glass sheet are more rapidly influenced by the furnace temperature or having been caused to bend to the mold contour are still sufficiently affected by such heat as to further bend or arch away from the mold surface. This is commonly known as "over-bending" and may be particularly evident in the outer end portions of the sheet.

To overcome this, the bracket 76 is adapted to be secured on the rail 82 of a mold by means of screws 83.

By the screws, it is possible to firmly position the bracket at any desired position of the rail and, more particularly, within the area of the shaping surface formed on the rail.

By so mounting the contactor pad 78, the same can be placed in any area of the mold and over any portion of a sheet to be bent which may not conform to the curvature to which the sheet bodily was intended to conform. This non-conformity may appear as a result of over-bending or failure of an area of the glass sheet to completely settle against the mold surface. However it may be caused, the glass may be restrained in, moved to conform to or be restored to the desired curvature, by means of the contactor pad 70 while it and the glass are subjected to a heated atmosphere. As shown in FIG. 12, a glass sheet 84 may have an area $k$ shown in full line which will not conform, due to the possibility of over-bending, to the exact curvature of the mold as evidenced by the broken line $m$. Preliminary to the bending operation, a locator of the modified construction may then be mounted by the bracket 76 and screws 83 on the mold rail 82. The contacting member or pad 78 preferably is not initially in surface contact with the highest point of the area of the glass sheet but it is arranged above such a probable area so that upon flexure of the bar 79, the positive motion of the same will cause the locator to move downwardly and press the glass downwardly at a time when the bar 79 and the glass sheet 84 are being influenced by heat at normal bending temperatures.

It is to be understood that the forms of the invention herewith shown and described are to be taken as illustrative embodiments only of the same, and that various changes in the shape, size and arrangement of parts may be resorted to without departing from the spirit of the invention or the scope of the subjoined claims.

I claim:

1. In apparatus for bending glass sheets, the combination with a mold upon which sheets are adapted to be bent when exposed to bending temperatures, of a sheet contacting member positioned to contact the glass sheet when on said mold, and a support for said member including a heat responsive member comprising elements of different coefficients of expansion which are operable at said bending temperatures to cause movement of said contacting member relative to said glass sheet and said mold.

2. In apparatus for bending glass sheets, the combination with a mold upon which sheets are adapted to be bent when exposed to bending temperatures, of a sheet contacting member positioned to contact the glass sheet when on said mold, and a support for said member comprising a bi-metallic bar composed of metals of different coefficients of expansion which are responsive to an increase in the bending temperature to move said contacting member relative to said mold and toward said sheet.

3. In apparatus for bending glass sheets, the combination with a mold upon which sheets are adapted to be bent when exposed to bending temperatures, of a plurality of sheet locating members positioned at opposite ends of the mold and between which a glass sheet to be bent is located, and a support for each of said members comprising a bi-metallic element including metals of different coefficients of expansion which are operable at said bending temperatures to move said locating members in continuing contact with the edges of the sheet as it bends.

4. In apparatus for bending glass sheets, the combination with a mold upon which sheets are adapted to be bent when exposed to bending temperatures, of a plurality of sheet locating members positioned at opposite ends of the mold and between which a glass sheet to be bent is located, a support for each of said members comprising a bi-metallic element including metals of different coefficients of expansion which are operable at said bending temperatures to move said locating members in continuing contact with the edges of the sheet as it bends, and means for limiting the movement of said bi-metallic element.

5. In combination with a glass bending mold having a shaping surface conforming to the curvature to which a sheet is to be bent on the mold, a heat responsive member mounted adjacent said shaping surface for movement in angular relation thereto and including elements having different coefficients of expansion, a glass contacting element carried by the heat responsive member and in position to contact a sheet when in bending position on the mold, said heat responsive member being operable at glass softening temperature to actively urge said contacting element in engagement with the glass during the bending operation.

6. In combination with a glass bending mold having a shaping surface conforming to the curvature to which a sheet is to be bent on the mold, a heat responsive member mounted adjacent said shaping surface for movement in angular relation thereto and including elements having different coefficients of expansion, a glass contacting element carried by the heat responsive member and in position to contact with a sheet when in bending position on the mold, said heat responsive member and glass contacting element thereon being operable at glass softening temperature to actively urge movement of the glass relative to the mold during the bending operation.

7. In combination with a glass bending mold having a shaping surface conforming to the curvature to which a sheet is to be bent on the mold, a sheet locator device composed of a heat responsive member and a glass engaging element, the heat responsive member being mounted adjacent to and for movement in angular relation with the shaping surface of the mold and including elements having different coefficients of expansion, the glass engaging element being carried on the said member and in position to normally engage a sheet when in bending position on the mold, said heat responsive member being operable at glass softening temperature to actively carry the said engaging element against the glass as it settles during the bending operation.

8. In combination with a glass bending mold having a shaping surface conforming to the curvature to which a sheet is to be bent on the mold, a sheet locator device composed of a heat responsive member and a glass engaging element, the heat responsive member being mounted adjacent to and for movement in angular relation with the shaping surface of the mold and including elements having different coefficients of expansion, the glass engaging element being carried on the said member and in position to normally engage a sheet when in bending position on the mold, said heat responsive member being operable at glass softening temperature to actively carry the said engagaing element against the glass as it settles during the bending operation, and means arresting movement of said member to effect separation of the engaging element from the glass before completion of the bending thereof.

9. In combination with a glass bending mold having a shaping surface conforming to the curvature to which a sheet is to be bent on the mold, a sheet locator device mounted adjacent the shaping surface of the mold, a heat responsive member including elements having different coefficients of expansion and forming the support for said locator device and secured at one end to the mold, a glass contacting element carried by the heat responsive member at its opposite end, said heat responsive member being operable at glass softening temperatures to actively move said sheet locator device in engagement with the glass.

10. In apparatus for bending glass sheets or plates, the combination with a mold having a shaping surface conforming to the curvature to which a sheet is to be bent on the mold; of sheet engaging devices in the form of hingedly articulated braces positioned adjacent the shaping surface of the mold to engage medial areas of an unbent sheet when in bending position on the mold, means supporting the articulated braces for movement out of engagement with an unbent sheet, heat responsive means including elements of different coefficients of expansion normally restraining said braces in engagement with the glass sheet and operable to release the same during the bending operation.

11. In apparatus for bending glass sheets or plates, the combination with a mold having a shaping surface conforming to the curvature to which a sheet is to be bent on the mold; of sheet engaging devices in the form of hingedly articulated braces positioned adjacent the shaping surface of the mold to engage medial areas of an unbent sheet when in bending position on the mold, each articulated brace being made up of hingedly interconnected links, a shaft rotatably carried on the mold, the lowermost link of each brace being fixedly secured to the shaft, a disc cam secured at one end of said shaft, a bimetal bar secured to the mold and disposed in engagement with the disc cam at its free end, said bimetal bar including metals of different coefficients of expansion and being responsive to glass softening temperatures to release said braces from engagement with said glass sheet during the bending operation.

12. In combination with a glass bending mold having a shaping surface conforming to the curvature to which a sheet is to be bent on the mold; of a device comprising a glass contacting element positioned in spaced relation above said shaping surface, and a heat responsive element mounted adjacent to and for movement relative to the shaping surface of the mold and fixedly carrying said contacting element, said heat responsive element including members of different coefficients of expansion and being operable at glass softening temperatures to actively carry the said contacting element against the glass sheet to be bent as said sheet settles during the bending operation.

13. In combination with a glass bending mold having a shaping surface conforming to the curvature to which a sheet is to be bent on the mold; of a glass contacting member located above said shaping surface, and a support for said member comprising a bi-metallic element including metals of different coefficients of expansion mounted adjacent to and for movement relative to the shaping surface and operable at glass softening temperatures to move said member toward said shaping surface.

14. In combination with a glass bending mold having a shaping surface conforming to the curvature to which a sheet is to be bent on the mold; of a device comprising a glass contacting element positioned in spaced relation above said shaping surface, a bracket carried by the mold, means for releasably securing said bracket to the mold in a preselected area, a bimetallic element secured at one end to said bracket said element including members of different coefficients of expansion and carrying said contacting element at its opposite end and operable at glass softening temperatures to actively lower the said contacting element into engagement with the glass and sustain the same on the shaping surface of the mold.

15. In apparatus for bending glass sheets, the combination with a mold upon which sheets are adapted to be bent when exposed to bending temperatures, of a sheet positioning device including a sheet contacting surface and elements of different coefficients of expansion which are operable at said bending temperatures to cause movement of said contacting surface relative to said mold.

16. In apparatus for bending glass sheets, the combination with a mold upon which sheets are adapted to be bent when exposed to bending temperatures, of a sheet locating device including a sheet contacting surface and a heat responsive portion made up of elements of different coefficients of expansion which are operable at said bending temperatures to cause movement of said contacting surface relative to said glass sheet and said mold.

17. In a bending mold for bending glass sheets, a movable sheet support for supporting and engaging a glass sheet intermediate the ends thereof, and temperature responsive means for causing movement of the sheet support out of engagement with the glass sheet prior to bending of the sheet into contact with the mold.

18. In a bending mold for bending glass sheets, a pair of spaced movable mold sections movable from an open position to a closed position, a movable sheet support mounted intermediate said mold sections for supporting and engaging a glass sheet intermediate the ends thereof, and temperature responsive means for causing movement of the sheet support out of engagement with the glass sheet prior to bending of the sheet into contact with the mold.

19. In a bending mold for bending glass sheets, a pair of spaced movable mold sections movable from an open position to a closed position, an intermediate section connecting said movable mold sections, a plurality of movable sheet supporting members mounted on said intermediate section for supporting and engaging a glass sheet along a central portion thereof, and temperature responsive means for causing simultaneous movement of said sheet supporting members out of engagement with the glass sheet prior to bending the sheet into contact with the mold.

20. In a bending mold for bending glass sheets, spaced mold sections supporting and engaging a glass sheet along oppositely disposed ends thereof, an intermediate mold section between said spaced mold sections, a plurality of movable sheet supporting members for supporting and engaging the glass sheet along a centrally disposed portion thereof, means mounting said sheet supporting members on said intermediate section for movement out of engagement with the glass sheet, and a temperature responsive member carried by said intermediate section and operatively connected to said mounting means for causing movement of the sheet supporting members out of engagement with the glass sheet prior to bending of the sheet into contact with the mold.

References Cited in the file of this patent

UNITED STATES PATENTS 2,840,953    Black                  July 1, 1958

FOREIGN PATENTS 763,705      Great Britain           Dec. 12, 1956